(12) United States Patent
Zuberi (10) Patent No.: US 10,601,635 B1
(45) Date of Patent: Mar. 24, 2020

(54) APPARATUS, SYSTEM, AND METHOD FOR WIRELESS MANAGEMENT OF A DISTRIBUTED COMPUTER SYSTEM

(75) Inventor: Azhar M. Zuberi, Del Mar, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 2425 days.

(21) Appl. No.: 10/826,705

(22) Filed: Apr. 16, 2004

(51) Int. Cl.
*H04L 12/24* (2006.01)
*H04L 29/08* (2006.01)
*H04L 29/06* (2006.01)

(52) U.S. Cl.
CPC .... *H04L 41/0213* (2013.01); *H04L 29/08072* (2013.01); *H04L 29/06* (2013.01); *H04L 41/12* (2013.01); *H04L 41/22* (2013.01)

(58) Field of Classification Search
CPC ........... H04L 41/0213; H04L 29/08072; H04L 29/06; H04L 41/22; H04L 41/12
USPC .................................................. 709/201, 223
See application file for complete search history.

(56) References Cited

U.S. PATENT DOCUMENTS

| 6,304,877 | B1 * | 10/2001 | LeBlanc | .................. H04L 41/00 |
| 6,438,577 | B1 | 8/2002 | Owens | |
| 6,625,645 | B1 | 9/2003 | Van Horne et al. | |
| 6,757,778 | B1 * | 6/2004 | van Rietschote | ..... G06F 3/0607 711/6 |
| 7,228,333 | B1 * | 6/2007 | Smith | .................... H04L 51/066 709/203 |
| 2003/0055735 | A1 * | 3/2003 | Cameron | ................ G06Q 20/04 705/27.1 |
| 2003/0084056 | A1 * | 5/2003 | DeAnna et al. | .............. 707/100 |
| 2003/0228866 | A1 * | 12/2003 | Pezeshki | ............... H04W 8/245 455/422.1 |
| 2004/0064196 | A1 * | 4/2004 | Furutono | ............ H04L 41/0893 700/1 |
| 2004/0098447 | A1 * | 5/2004 | Verbeke et al. | ............... 709/201 |

OTHER PUBLICATIONS

Tom Sheldon, Encyclopedia of Networking & Telecommunications, Copyright 2001, McGraw-Hill Companies, pp. 595-597.*

* cited by examiner

*Primary Examiner* — Joseph L Greene
(74) *Attorney, Agent, or Firm* — Daly, Crowley, Mofford & Durkee, LLP (57) ABSTRACT

An apparatus, system, and method provide remote management of a distributed computer system through a wireless communication link. A wireless server application utilizes a stateless protocol to communicate with a wireless client. An administrator uses the wireless client running on a portable device connected to a wireless server through the wireless communication link to access a network management application connected to the distributed computer network.

25 Claims, 3 Drawing Sheets

FIG. 4

APPARATUS, SYSTEM, AND METHOD FOR WIRELESS MANAGEMENT OF A DISTRIBUTED COMPUTER SYSTEM

BACKGROUND OF THE INVENTION

The invention relates in general to distributed computer systems and more specifically to an apparatus, system, and method for wirelessly managing a distributed computer system.

Distributed computer systems may include any number of networked devices such as computers, servers, and memory storage devices that are interconnected through a network. The network typically includes a combination of interconnected network devices such as hubs, switches, and routers. Many of the network devices and networked devices operate in accordance with a configuration that can be set and modified. The configuration is typically managed with the use of configuration objects that represent logical or virtual arrangements and relationships and define any number of structures, allocations, operational rules, priorities, preferences, or functions related to memory, data storage, bandwidth, communication paths, and communication protocols. A configuration object includes procedures and data that define the configuration of at least a portion of the system, where the data includes configuration parameters that represent settings or other stored values pertaining to individual devices. Configuration parameters, therefore, may include settings, addresses, names, identifiers, pathnames, operational minimums and maximums, bandwidths, time limits and other values. By setting and managing the configuration objects, management tasks can be performed. An example of a management task includes establishing an end-to-end path between a host system and a networked storage device that may include the configuration tasks of creating a storage volume, setting the access controls of the storage volume, setting the access controls of the network and configuring the host adapters. The configuration parameters are often chosen or otherwise established during an initial configuration of the system and are periodically adjusted for various reasons by modifying and managing the configuration objects. Typically, the configuration is established and adjusted in response to changes in the needs that the system must fulfill, to meet such purposes as allocating and providing access to resources such as storage or network capacity, for protecting such resources, and to maximize the performance and efficiency of the individual devices and the system as a whole. Often, the distributed computer system is managed by an administrator that directly interfaces with some or all of the system devices to set or change the configuration. As the size and complexity of distributed computer systems increase, the level required to manage the system also increases making the responsibility of maintaining and managing the system extremely burdensome. Conventional management systems are limited in that the administrator must communicate through a direct wired connection or other connection having sufficient bandwidth. Further, the administrator must typically have access to computer hardware with sufficient processing power to run a client side application. The administrator, therefore, is often required to remain geographically near the network or equipment that provides an adequate connection to the network management program. This can be extremely burdensome to the administrator often requiring the administrator to access such equipment at inconvenient times. Delays often result due to the inability of the administrator to quickly gain access to the system. Depending on the particular enterprise utilizing the network, the various delays, inefficiencies, and down time may result in significant decreases in productivity and losses of revenue.

Accordingly, there is a need for an apparatus, system and method for remotely managing a distributed computer system through a wireless communication link.

DETAILED DESCRIPTION OF THE PREFERRED EMBODIMENTS

In an exemplary embodiment of the invention, an apparatus, system, and method provide remote management of a distributed computer system through a wireless communication link. An administrator utilizes a wireless client running on a portable device connected to a wireless server through the wireless communication link to access a network management application connected to the distributed computer network. The administrator sends, requests, and receives network management information such as configuration data and performance data. Further, the configuration of the distributed computer network can be established and modified using the portable device. The wireless server provides an interface between the wireless client and a management application by exchanging network management information through a packet switched network using a stateless protocol suitable for communication through a packet switched network such as the Internet. In the exemplary embodiment, the wireless server communicates with the management application using Java data objects and communicates with the wireless client using Hypertext Transfer Protocol (HTTP). The wireless server, therefore, provides a transparent interface between the network management application and the wireless client in the exemplary embodiment.

Figure 1:
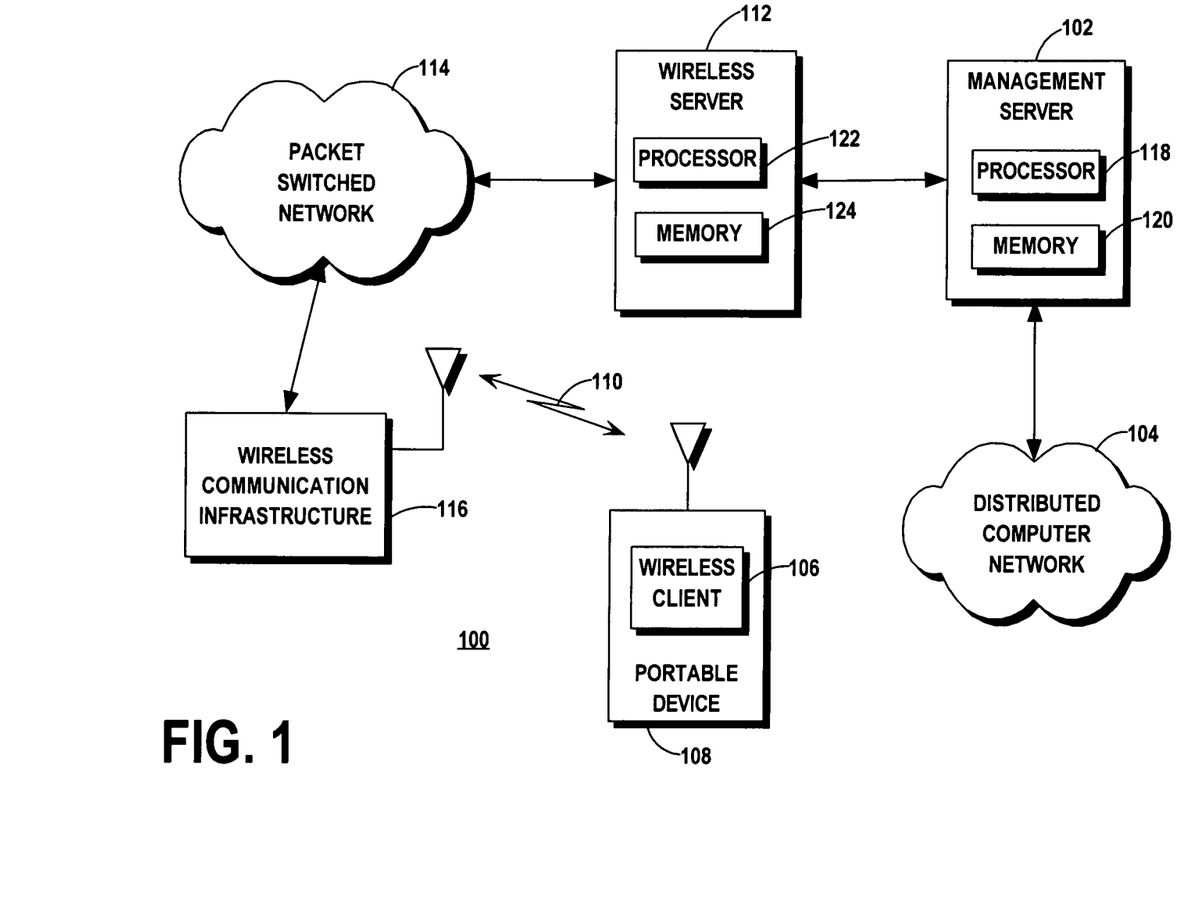
FIG. 1 is a block diagram of a distributed computer management system in accordance with the exemplary embodiment of the invention.

FIG. 1 is a block diagram of a distributed computer management system 100 in accordance with the exemplary embodiment of the invention. The distributed computer management system 100 includes a distributed computer network 104 that may include any combination of hardware, software, and infrastructure where at least a portion of the hardware is geographically distributed and interconnected through one or more communication channels.

A management server 102 facilitates monitoring and management of the distributed computer network 104. An administrator accesses a network management application running on the management server 102 through a network management client allowing the administrator to set preferences, configure and reconfigure network settings, monitor performance, establish communication paths, distribute functionality, define memory settings and perform other network management tasks. Examples of network management tasks include the construction, removal, or modification of logical or virtual entities such as virtual private networks, file systems, logical storage volumes, computing clusters, or communication paths; the modification of attributes or parameters such as names, addresses, priorities, permitted modes of operation, access controls, capacities, or levels of service; and the assignment of resources to (or removal of resources from) applications, such as the assignment of storage resources to a database application, or the assignment of network load balancing resources to an application such as a web server. Those skilled in the art will recognize the other types of network management tasks that may be performed in accordance with known techniques based on the teachings herein. Client-side software running on a personal computer (PC) or other processor connected to the network management server 104 provides the network management client. Several network management clients may be connected to the management server 102 through a variety of communication links and paths in accordance with known techniques. In conventional systems, the network management clients are limited to operating on computers having relatively robust processing power since much of the processing is performed by the client software.

In the exemplary embodiment, a wireless client 106 on a portable device 108 allows the administrator to access the management sever 102 through a wireless communication link 110. A wireless server 112 provides an interface between the management server 102 and a packet switched network 114. Wireless infrastructure 116 connected to the packet switched network 114 facilitates wireless communication with the portable device 102.

The wireless server 112 communicates with the wireless client 106 through the packet switched network 114 using a stateless protocol. In the exemplary embodiment, the packet switched network 114 includes the Internet. The packet switched network 114, however, may be any type of communication network. In some circumstances, at least portions of the packet switched network 114 may include private communications networks. Further, the wireless server 112 may be connected to the packet switched network 114 through one or more other networks that may include any number of circuit switched networks, packet switched networks, and computer networks.

The wireless communication infrastructure 116 is any combination of hardware and software that provides wireless communication to the portable device 108 and supports the stateless protocol. As is known, a stateless protocol is a protocol does not require the maintenance of any information regarding previous communications. The wireless communication infrastructure 116 in the exemplary embodiment is a cellular communication system that supports hypertext transfer protocol (HTTP). The wireless communication infrastructure 116 may, however, utilize wireless techniques in accordance with, for example, point to point microwave, infrared, radio frequency (RF), IEEE 802.11, and satellite communication systems in some circumstances.

The portable device 108 includes hardware and software that facilitates communication through the wireless communication link 110 with the wireless communication infrastructure 116. Examples of suitable portable devices 108 include cellular telephones, personal digital assistants (PDAs), and laptop computers. The wireless communication hardware may be integrated with the portable device 108 or may be provided by a removable module. For example, a wireless interface card having an interface in accordance with PCMCIA (Personal Computer Memory Card International Association) standards may be connected to a device such as PDA or laptop computer to form the portable device 108 capable of communicating through the wireless communication link 110. The portable device 108 includes a processor, microprocessor, or other processor arrangement suitable for running a wireless client application to provide the wireless client 106. In the exemplary embodiment, JAVA code executed on a JAVA virtual machine running on the processor provides the wireless client 106. As is known, many portable devices 108 such as cellular telephone include the necessary hardware and software for running downloadable JAVA code. The JAVA code, therefore, may be loaded unto the portable device 108 by accessing the appropriate URL (Uniform Resource Locator) and downloading the JAVA code through the wireless communication link 110.

In the exemplary embodiment, the wireless client 106 provides a graphical user interface (GUI) through a user interface of the portable device 108. The user interface includes any number of input devices and output devices. An example of a suitable output device is a visual display. In some circumstances, the visual display may be a touch screen and, therefore, may also be an input device. Examples of other suitable output devices include speakers, attached printers, projectors, and vibratory output devices. Examples of suitable input devices include keypads, keyboards, computer mice, joysticks, touch pads, touch screens, and microphones. The user interface allows the administrator to enter and receive information that, in most situations, includes textual information entered through the keypad and information viewed through the visual display.

The distributed computer network 104 includes any number of networked devices and network devices. Examples of networked devices include storage devices, server computers such as application servers, and management servers. Network devices within the distributed computer network 104 facilitate communication between networked devices as well as other network devices. Examples of network devices include hubs, routers, switches, gateways, and other hardware, infrastructure and software that facilitate the transmission of data, instructions and messages throughout the network 104. The network devices may be interconnected using any of several known communication infrastructures and communication media such as wire, fiber optic cable, and wireless channels such as infrared, radio frequency (RF), microwave, satellite and optical communication channels.

The application servers within the distributed computer network 104 may include any combination of processors and memory that perform the functions of a server computer that is suitable for running software applications. The applications may communicate with other networked devices such as other application servers and storage devices. In many situations, the application servers may be accessed by work stations, personal computers, or other devices connected to the distributed computer network 104.

In the exemplary embodiment, the storage devices are mass storage devices such as disk drives or tape drives. Other types of storage devices may be used in some circumstances. Some storage devices, for example, may include optical disks.

Any combination of topologies can be used to implement the distributed computer network 108 including topologies utilizing bus, star, and ring topology techniques. Further, the distributed computer network 104 or portions of the distributed computer network 104 may include any number of local area networks (LANs), wide area networks (WANs), and storage area networks (SANs). The communication network 104 transmits data, signals, and messages using one or more protocols. Examples of suitable protocols are protocols utilized in Ethernet and Fibre Channel networks. Examples of some Fibre Channel topologies include Point-To-Point, Arbitrated Loop, and FC Fabric.

Those skilled in the art will readily recognize the various topologies, protocols, architectures, and implementations of the distributed computer network 104 and the distributed computer management system 100 that can be used based on these teachings and known techniques. The functions and operations of the blocks described in FIG. 1 may be implemented in any number of devices, circuits, or infrastructure. Two or more of the functional blocks may be integrated in a single device and the functions described as performed in any single device may be implemented over several devices. For example, a hardware component within the system 100 may operate as a networked device as well as a network device in some situations.

The management server 102 includes at least a processor 118 and a memory 120 for running network management software and other software facilitating the overall functionality and operation of the management server 102. The processor 118 is any type of processor, microprocessor, processor arrangement, or computer configured to execute computer readable code and includes one or more processors or computers. At least a portion of the memory 120 includes a non-volatile memory medium suitable for storing the computer readable code such as a disk drive. In the exemplary embodiment, the management server 102 is a server computer running system management software that utilizes one or more interface modules to communicate with the network devices and networked devices. The interface modules include at least software code that performs translation, conversion or interface functions to allow the management server 102 to set, change, monitor or retrieve configuration parameters of a network device or a networked device. The implementation and operation of the interface modules depend on the particular devices that are accessed, the information that is exchanged and other factors related to the distributed computer network 104 and the system management application. Depending on the particular device, the interface modules may be commercially available or may be implemented based on the particular protocol and other requirements of the devices. The functionality of the interface modules may be implemented in a single module or computer program or may be distributed over several hardware device, programs, subprograms or subroutines. As described below in further detail, a Remote Method Invocation (RMI) interface running on the management server 102 facilitates communication with the wireless server 112 and clients (106).

The wireless server 112 includes at least a processor 122 and a memory 124 for running wireless transformation and interface software and other software facilitating the overall functionality and operation of the wireless server 112. The processor 122 is any type of processor, processor arrangement, microprocessor, or computer configured to execute computer readable code and includes one or more processors or computers. At least a portion of the memory 124 includes a non-volatile memory medium suitable for storing the computer readable code such as a disk drive. In the exemplary embodiment, the wireless server 112 is a server computer running wireless server application software that provides a system interface engine and a transformation engine. Although the wireless server 112 and the management server 102 are shown as separate blocks in FIG. 1, the functions of both may be implemented in a single server in some circumstances. Further, the functions of the management server 102 and the wireless server 112 may be distributed over several servers in some circumstances.

The methods and apparatus of this invention may take the form, at least partially, of program logic or program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. When the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system 100 and wireless server 112 described with reference to FIG. 1. One aspect of the invention is embodied as a method that is described below with reference to FIGS. 2-4. In the exemplary embodiment described herein, computer readable code stored in memory 124 is executed by the processor 122 within the wireless server 112. Other types and combinations of hardware, software and firmware may be used implement the functions described. For purposes of illustrating the present invention, therefore, the invention is described as embodied in a specific configuration, but one skilled in the art will appreciate that the device is not limited to the specific configuration but rather only by the claims included with this specification.

Figure 2:
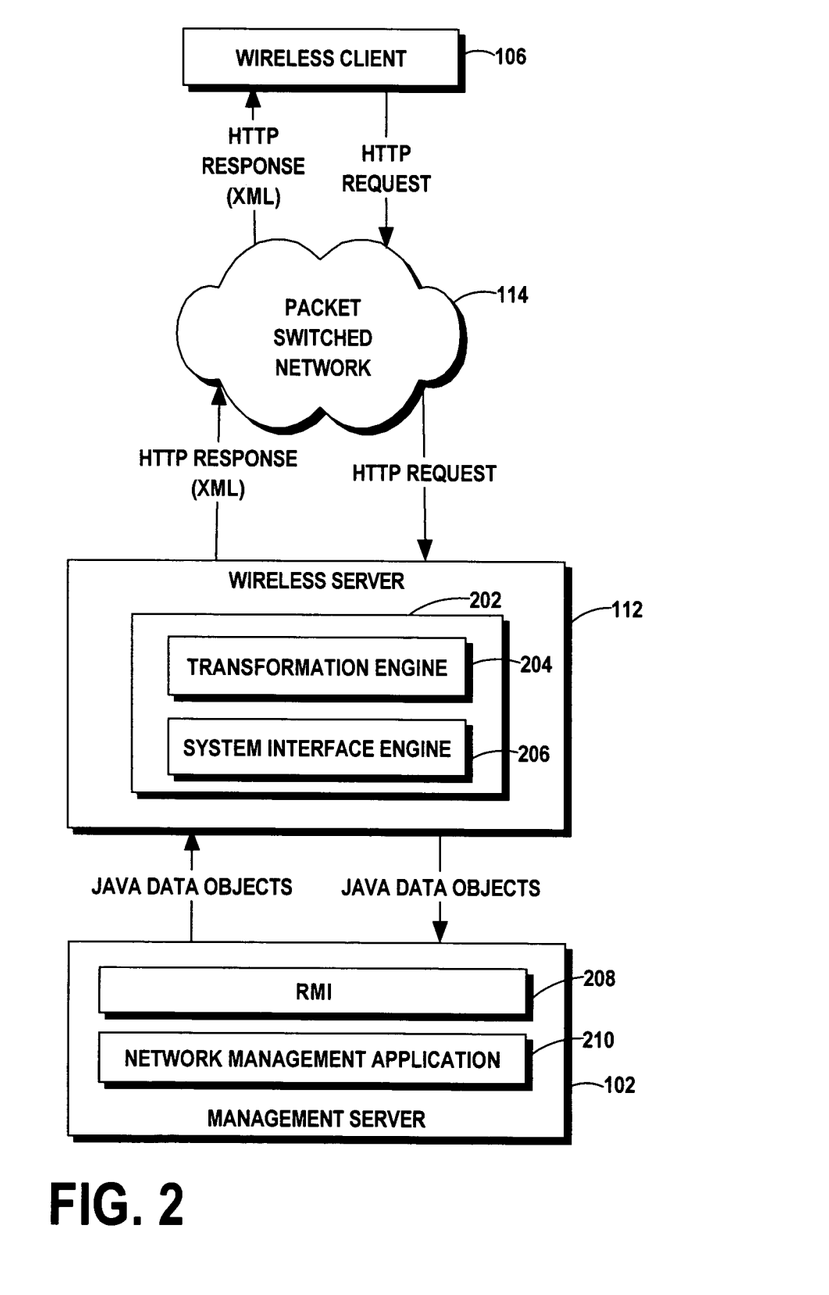
FIG. 2 is a block diagram of the management server communicating with the wireless client where the wireless server communicates through the packet switched network using hypertext transfer protocol (HTTP) and exchanges Java data objects with the management server in accordance with the exemplary embodiment of the invention.

FIG. 2 is a block diagram of the management server 102 communicating with the wireless client 106 where the wireless server 112 communicates through the packet switched network 114 using HTTP and exchanges Java data objects with the management server 102. Any of several stateless protocols can be used to communicate through the packet switched network 114. In the exemplary embodiment, however, the wireless server 112 transmits and receives messages in accordance with the hypertext transfer protocol (HTTP). HTTP is a stateless protocol since the protocol does not maintain any information regarding previous communications. Further, network management information can be exchanged between the network management application 210 and the wireless server application 202 using any protocol or communication scheme. The particular method of exchanging may be based on standard techniques or proprietary formats where the particular method may depend, at least in-part, on the particular programming language used to implement the network management application 210.

The network management information includes commands, instructions, requests, data and other information related to managing the distributed computer network 104. The network management information includes information entered by the administrator and transmitted by the wireless client 106 and information that is received from the network management application 210. Examples of network management information include data related to the identification of devices, performance, errors messages, warning messages, configuration descriptions, configuration changes, device capacity, communication paths and routing information.

During operation of the exemplary embodiment, the administrator uses the wireless client to communicate with the management server 102. As explained above, the portable device 108 includes, or is connected to, a user interface including an input device such as a keypad and an output device such as a visual display. The wireless client 106 presents the administrator with a GUI to facilitate the exchange of information through the portable device 108. The wireless client 106 generates an HTTP network management request corresponding to information, instructions, commands and requests entered by the administrator through the user interface. A character string is assembled that conforms to the protocol of the packet switched network 114. The HTTP network management request is processed, modulated, amplified, and transmitted by the wireless communication hardware and software of the portable device 108 in accordance with known techniques and the teachings presented herein.

In the exemplary embodiment, a portion of the string comprising the HTTP network management request may be generated by instructions entered using a menu or other GUI presenting a finite set of selectable commands, instructions, or requests. Further, a portion of the string may be generated based on characters entered using the keypad. For example, the administrator may select a command instructing the management server to perform a poll of devices connected to the network using arrow keys on the keypad and may enter a device name or subscript identifier that limits the polled devices to memory devices. The wireless client 106 assembles the information in an appropriate string to generate the HTTP network management request that conforms to the protocol of the packet switched network 114.

The HTTP request is transmitted though the wireless communication link 110 to the wireless communication infrastructure 116 and routed through the packet switched network 114 in accordance with known techniques. A wireless server application 202 running on the wireless server 112 receives the HTTP network management request. The wireless server application 202 performs transformation and interface functions to generate the corresponding Java objects that can be conveyed to the management server 102 over a secure socket layer (SSL). The wireless server application 202 comprises a transformation engine 204 and a system interface engine 206. After receiving the HTTP network management request posted by the wireless client 106, the wireless server 112, initiates a session, parses the HTTP network management request to extract the appropriate request parameters and forwards the request parameters to the transformation engine 204. Operating at a system independent layer, the transformation engine 204 determines the type of network management request based on the request parameters. The network management request may be a report request or a control request where a report request is a query for network information and a control request changes, reconfigures, or otherwise controls devices, engines, or other objects in the system. Using the Application Programming Interface (API) and the request parameters, the transformation engine 204 creates Java Data Objects corresponding to the HTTP network management request. The transformation engine invokes the appropriate service or method of the system interface engine 206 and forwards the Java Data Objects. As explained below in further detail, the transformation engine 204 receives a response object from the system interface engine 206 in response to the data objects representing the HTTP network management request.

The system interface engine 206 provides an interface between the transformation engine and the remote interface 208 of the network manager. The system interface engine 206 provides an interface in accordance with the API to the transformation engine 204 and communicates with the remote method invocation interface (RMI interface) 208 running on the management server 102.

As is known, RMI is set of protocols that enables Java objects to communicate remotely with other Java objects. The RMI interface 208 is a communication layer that facilitates the exchange of Java data objects in accordance with the RMI protocols. The RMI 208 presents the Java data objects representing the network management request to the network management application 210. A RMI network management request is generated based on the network management information transmitted in the HTTP network management request. The RMI network management request representing the HTTP network management request invokes the appropriate task of the network management application 210.

The system interface engine 206 performs a search or a "service lookup" for the services or methods required to complete the system call to the network management application 210. Depending on the method invoked by the transformation engine 204 and the type of data object, the system interface engine 206 locates the one or more service objects corresponding to the required services. In the exemplary embodiment, the network management data object may be a control data object request or a report data object request although the wireless server 112 may be implemented to distinguish and process any number of data object types. The service objects are loaded into memory associated with the system interface engine 206. The parameters of the received data object are serialized and presented to the service object. The service object processes the system call in accordance with the data object parameters by performing the appropriate tasks to communicate with the network management application 210 through the RMI interface 208. In the exemplary embodiment, the appropriate Java data objects are transmitted over a SSL interface. After presenting the appropriate communication to the RMI interface 208 to perform the network management request, the system interface engine 206 waits or "blocks" until either the system call is processed successfully or an error, such as time out condition, occurs.

The network management application 210 processes the RMI network management request that is presented through the system call processed by the system interface engine 206 and responds with one or more Java data objects representing the network management response. The system interface engine 206 forwards a response object based on the results of the network management request to the transformation engine 204. In the exemplary embodiment, the system interface engine 206 generates and forwards either an error response object, a success response object, or a report response object. If the network management application returns an error or times out in response to the network management request, the system interface engine 206 forwards the error response object to the transformation engine 204. If the network management request results in the successful completion of control request, the system interface engine 206 returns the success response object to the transformation engine 204. A report response object containing the requested the data of a query request is returned when the network management request is a query request that is successfully processed by the network management application 210.

The transformation engine 204 generates an HTTP response based on the Java data objects received from the management server 102. In the exemplary embodiment, the transformation engine 204 creates an XML (eXtensible Markup Language) message that conforms to HTTP. In some circumstances, other markup languages and protocols can be used. The transformation engine 204 generates an XML string corresponding to the response object returned by the system interface engine 206. Therefore, in the exemplary embodiment, the transformation engine 204 generates either an error response XML message, a success response XML message, or a report response XML message corresponding to the error response object, the success response object and the report response object, respectively. Accordingly, the HTTP response is an XML message including request data, an error indication, or an indication that a control request was successfully performed by the network management application 210.

The HTTP response is transmitted through the packet switched network 114 and the wireless infrastructure in accordance with known techniques. The wireless client 106 deciphers the HTTP response to present the response information through the GUI to the administrator.

The remote wireless management system 100, therefore, allows the administrator to access and communicate with the network management application 210 to manage the distributed computer network 104 using a wireless portable device 108. In addition to the various commands, instructions, and requests related to managing the distributed computer network 104, various other authentication, identification, and logon tasks are performed through the wireless network management system 100.

Figure 3:
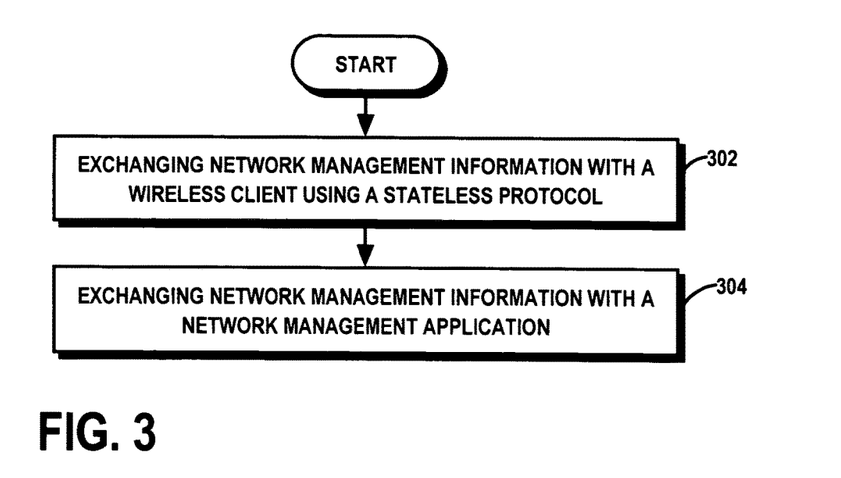
FIG. 3 is a flow chart of a method of managing the distributed computer network in accordance with the exemplary embodiment of the invention.

FIG. 3 is a flow chart of a method of managing the distributed computer network 100 in accordance with the exemplary embodiment of the invention. The method may be performed by any combination of hardware and software and is not limited to execution within devices described with reference to FIG. 1 and FIG. 2. In the exemplary embodiment, however, the method is performed by the wireless server application 202 connected within the network management system 100. The method establishes a transparent interface between a wireless client 106 and the network management application 210. The wireless server application 202 translates communications exchanged with the network management application 210 to messages compatible with a stateless protocol such as protocols used for communication through the Internet and generates messages compatible with the network management application 210 based on the messages received from the wireless client 106.

At step 302, the network management information is exchanged with a wireless client 106 using a stateless protocol. In the exemplary embodiment, the stateless protocol is a HTTP (Hypertext Transfer Protocol). As discussed in further detail below, the wireless server application 202 receives, requests, and transmits responses that conform to TCP/IP and HTTP. As is known, HTTP is a stateless protocol since messages do not depend on previous communications.

At step 304, the network management information is exchanged with the network management application 210. In the exemplary embodiment, the wireless server application 202 exchanges data objects over a SSL to communicate with the network management application 210. In the exemplary embodiment, the network management application 210 is implemented in Java and the RMI facilitates the exchange of Java objects with the network management application 210. Other programming platforms, however, may be used in some circumstances.

Figure 4:
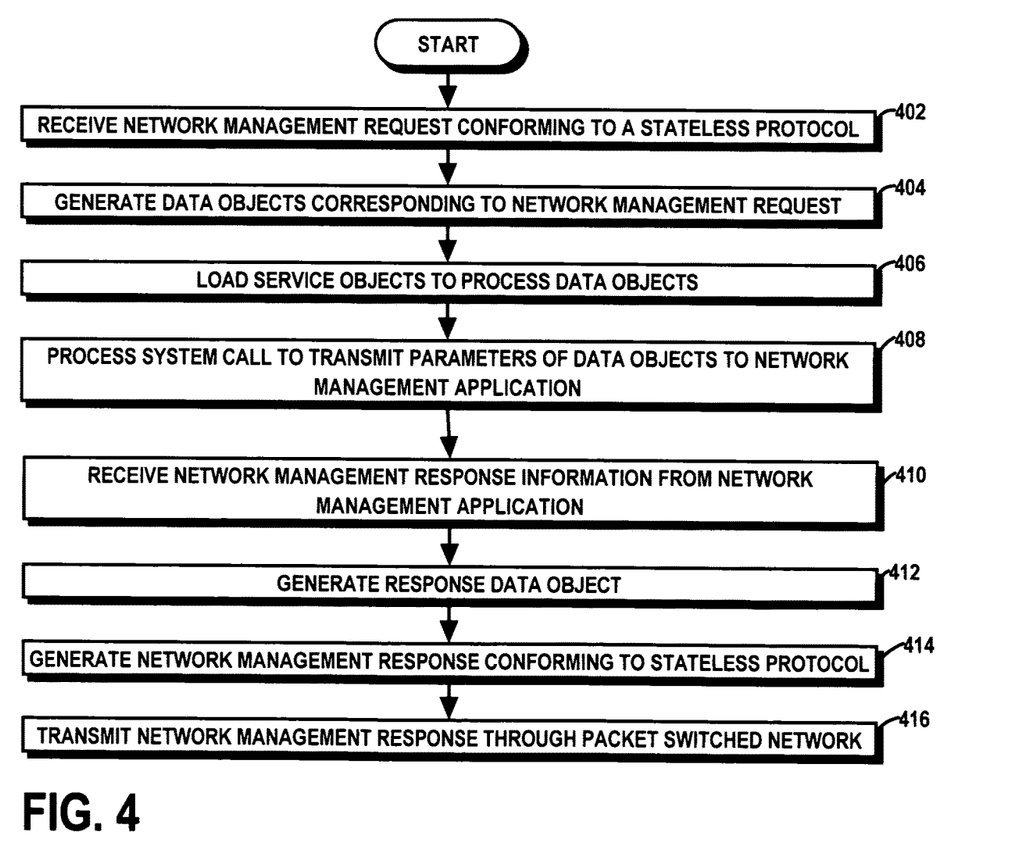
FIG. 4 is a flow chart of a method of performing an exchange of network management information in accordance with the exemplary embodiment of the invention.

FIG. 4 is a flow chart of a method of performing an exchange of network management information in accordance with the exemplary embodiment of the invention. Accordingly, the method described with reference to FIG. 4 is an exemplary method of performing steps 302 and 304 of FIG. 3.

At step 402, a network management request conforming to a stateless protocol is received from a wireless client 106. In the exemplary embodiment, an HTTP message is received through the Internet (114) from the wireless client 106. Network management information entered by the administrator through a user interface of the portable device 108 is used to generate an HTTP network management request that conforms to TCP/IP. The HTTP network management request is processed and transmitted through the wireless communication link 110 to the wireless communication infrastructure 116 in accordance with known techniques. The wireless infrastructure 116 demodulates, filters, and processes the wireless signals allowing the HTTP request to be introduced into the Internet (114). The HTTP network management request is routed through the Internet (114) in accordance with known techniques. As is known, a portion of HTTP messages include an address that indicates the intended destination of the message and allows the HTTP message to be routed appropriately. The wireless server application 202 receives and parses the HTTP network management request to extract the network management information parameters.

At step 404, a data object corresponding to the network management request is generated. In the exemplary embodiment, the transformation engine 204 generates Java data objects based on the network management information parameters extracted from the HTTP network management request. The transformation engine 204 determines if the request is a report request or a control request. Using the API exposed by the system interface engine 206, the transformation engine generates a request data objects based on the network management information parameters.

At step 406, the system interface engine 206 loads service objects to process the data objects. The system interface engine 206 performs a search or "lookup" procedure to identify the appropriate service objects for establishing the system call with the network management application through the RMI interface 208. Depending on the type of data object and the method invoked by the transformation engine 204, the system interface engine locates and loads the service objects.

At step 408, a system call is processed to transfer the network management information to the network management application to perform the network management request. Applying the data objects to the service objects, the system interface engine 206 processes the system call with the network management application 210 to perform the appropriate tasks to process the network management information and complete the network management request. In the exemplary embodiment, the RMI interface 208 facilitates the exchange of parameters between the system interface engine 206 and the network management application 210. The system interface engine 206 creates the appropriate communication messages to conform to the format and protocol utilized by the RMI interface 208 and the network management application 210. Where programming platform other than Java is used, the system interface engine 206 generates the appropriate objects conforming to the particular platform. The network management application processes the network management data object to invoke the particular task corresponding to the request.

At step 410, the network management response information is received from the network management application. The network management response information may include a confirmation that a control request was performed, data requested by a report request, or an error. An error may be generated where a time out condition occurs and no information is received from the network management application 210.

At step 412, a response data object is generated. As explained above, the response data object may be a success response object, an error response object or a report response object. In the exemplary embodiment, network management application 210 produces the response data object in response to the received network management request information returned from the network management application 210. The Java response data objects are forwarded through the system interface engine 206 to the transformation engine 204.

At step 414, a network management response conforming to the stateless protocol is generated based on the response data objects. In the exemplary embodiment, the response Java data objects are used to generate a XML response conforming to HTTP. In the exemplary embodiment, the transformation engine 204 generates either an error response XML message, a success response XML message, or a report response XML message corresponding to the error response object, the success response object and the report response object, respectively. Therefore, the HTTP response is an XML message including request data, an error indication, or an indication that a control request was successfully performed by the network management application 210.

At step 416, the network management response is transmitted through the packet switched network. In the exemplary embodiment, the HTTP response is transmitted through the Internet (114) and through the wireless infrastructure to the wireless client running on the portable device.

Therefore, the system, apparatus and method in accordance with the invention provides an administrator with a valuable tool for managing a distributed computer network 104 with a wireless portable device 108. The wireless client 106 requires relatively low processing power allowing the wireless client 106 to operate on a variety of portable devices such as cell phones and PDAs. The wireless server 112 provides a transparent interface between the network management application 210 and the packet switched network 114. Network management information is exchanged with the wireless server 112 using a stateless protocol allowing communication infrastructure such as packet switched networks and the Internet to connect the wireless client 106 to the network management application 210. Loading the wireless client software onto a cellular phone or other portable device 108, creates a device for remotely and wireless managing the distributed computer network 104.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A computer implemented method of remotely managing a distributed computer network system, the method comprising: sending network management information from a wireless device on a first wireless network using a stateless protocol to a wireless server application running on a wireless server, wherein the wireless device includes a virtual machine which sends the network management information; receiving the network management information at the wireless server application from the wireless device via a packet-switched network using hypertext transport protocol (HTTP); wherein the wireless server application has a transformation engine and a system interface engine; parsing, by the wireless server, the network management information in the stateless protocol; sending, by the wireless server, the parsed information to the transformation engine; determining, at the transformation engine, the type of network management request based on parameters in the request, wherein the transformation engine uses an Application Programming Interface (API) exposed by the system interface engine to generate a request data object based on network management parameters extracted from the network management information; transforming, by the transformation engine, the parsed management information to a format for use by a management server at the distributed computer network system; wherein the management server facilitates the monitoring and management of the distributed computer network system via the wireless client; performing a search, by the system interface engine to complete a call to the management server; presenting to the management server, by the system interface engine, the call corresponding to the network management information; processing, by the management server, the system call for at least one device of the distributed computer network system and receiving a response to the processing; sending the result of the processing to the system interface engine; sending the result of the processing from the system interface engine to the transformation engine; generating, by the transformation engine, a response in a stateless protocol corresponding to the result of the processing; sending the response to the wireless device through the packet-switched network; and presenting, via the wireless device, the response to an administrator using a GUI on the wireless device, wherein the wireless server operates as a transparent interface between the wireless client and a network management application of the management server by communicating with the wireless client via the HTTP and with the network management application via Java data objects, and the wireless server further operates as a transparent interface between the network management application and the packet-switched network via the HTTP and the Java data objects, the method further comprising: performing, via the wireless server, transformation and interface functions to generate the Java data objects; and after receiving a HTTP network management request posted by the wireless client, the wireless server initiates a session via the wireless server, parses the HTTP network management request to extract appropriate request parameters, and forwards the request parameters to the transformation engine; wherein the network management information includes commands of set preferences and/or monitor performance, the commands configured to enable remote management functions of the distributed computer network system; and wherein the request data object comprises a control request that changes, reconfigures and controls devices, engines and objects in the system.

2. The method of claim 1 wherein the wireless server application communicates with the management server over a SSL and wherein the network management information is generated from input to the GUI on the wireless device by the administrator.

3. The method of claim 2 wherein the wireless device is unable to communicate with the management server.

4. The method of claim 3 wherein the management server is able to construct, remove, and modify logical and virtual entities including virtual private networks, file systems, and logical storage volumes in response to network management information.

5. The method of claim 3 wherein the distributed computer network system includes storage devices, server computers, switches, and routers.

6. The method of claim 4 wherein the stateless protocol includes HTTP and the transformation engine creates responses in XML, that conform to HTTP and wherein the wireless server determines whether the network management information corresponds to a report request or the control request.

7. A system for managing a distributed computer network system, the system comprising: a wireless device comprising a processor communicatively coupled to a first wireless network, wherein the wireless device includes a virtual machine which sends network management information; a wireless server application running on a wireless server; wherein the wireless server application has a transformation engine and a system interface engine; a management server; the distributed computer network system; and computer-executable logic operating in memory, wherein the computer-executable program logic is configured for execution of: sending the network management information from the wireless device on the first wireless network using a stateless protocol to the wireless server application running on the wireless server; receiving the network management information at the wireless server application from the wireless device via a packet-switched network using hypertext transport protocol (HTTP); parsing, by the wireless server, the network management information in the stateless protocol; sending, by the wireless server, the parsed information to the transformation engine; determining, at the transformation engine, the type of network management request based on parameters in the request, wherein the transformation engine uses an Application Programming Interface (API) exposed by the system interface engine to generate a request data object based on network management parameters extracted from the network management information; transforming, by the transformation engine, the parsed management information to a format for use by the management server at the distributed computer network system; wherein the management server facilitates the monitoring and management of the distributed computer network system via the wireless client; performing a search, by the system interface engine to complete a call to the management server; presenting to the management server, by the system interface engine, the call corresponding to the network management information; processing, by the management server, the system call for at least one device of the distributed computer network system and receiving a response to the processing; sending the result of the processing to the system interface engine; sending the result of the processing from the system interface engine to the transformation engine; generating, by the transformation engine, a response in a stateless protocol corresponding to the result of the processing; sending the response to the wireless device through the packet-switched network; and presenting, via the wireless device, the response to an administrator using a GUI on the wireless device, wherein the wireless server operates as a transparent interface between the wireless client and a network management application of the management server by communicating with the wireless client via the HTTP and with the network management application via Java data objects, and the wireless server further operates as a transparent interface between the network management application and the packet-switched network via the HTTP and the Java data objects; the method further comprising: performing, via the wireless server, transformation and interface functions to generate the Java data objects; and after receiving a HTTP network management request posted by the wireless client, the wireless server initiates a session via the wireless server, parses the HTTP network management request to extract appropriate request parameters, and forwards the request parameters to the transformation engine; wherein the network management information includes commands of set preferences and/or monitor performance, the commands configured to enable remote management functions of the distributed computer network system; and wherein the request data object comprises a control request that changes, reconfigures and controls devices, engines and objects in the system.

8. The system of claim 7 wherein the wireless server application communicates with the management server over a SSL and wherein the network management information is generated from input to the GUI on the wireless device by the administrator.

9. The system of claim 8 wherein the wireless device is unable to communicate with the management server.

10. The system of claim 9 wherein the management server is able to construct, remove, and modify logical and virtual entities including virtual private networks, file systems, and logical storage volumes in response to network management information.

11. The system of claim 10 wherein the distributed computer network system includes storage devices, server computers, switches, and routers.

12. The system of claim 10 wherein the stateless protocol includes HTTP and the transformation engine creates responses in XML, that conform to HTTP and wherein the wireless server determines whether the network management information corresponds to a report request or the control request.

13. A computer program product for remotely managing a distributed computer network system, the computer program product comprising: a non-transitory computer readable medium encoded with computer executable program code enabled for execution of: sending network management information from a wireless device on a first wireless network using a stateless protocol to a wireless server application running on a wireless server, wherein the wireless device includes a virtual machine which sends the network management information; receiving the network management information at the wireless server application from the wireless device via a packet-switched network using hypertext transport protocol (HTTP); wherein the wireless server application has a transformation engine and a system interface engine; parsing, by the wireless server, the network management information in the stateless protocol; sending, by the wireless server, the parsed information to the transformation engine; determining, at the transformation engine, the type of network management request based on parameters in the request, wherein the transformation engine uses an Application Programming Interface (API) exposed by the system interface engine to generate a request data object based on network management parameters extracted from the network management information; transforming, by the transformation engine, the parsed management information to a format for use by a management server at the distributed computer network system; wherein the management server facilitates the monitoring and management of the distributed computer network system via the wireless client; performing a search, by the system interface engine to complete a call to the management server; presenting to the management server, by the system interface engine, the call corresponding to the network management information; processing, by the management server, the system call for at least one device of the distributed computer network system and receiving a response to the processing; sending the result of the processing to the system interface engine; sending the result of the processing from the system interface engine to the transformation engine; generating, by the transformation engine, a response in a stateless protocol corresponding to the result of the processing; sending the response to the wireless device through the packet-switched network; and presenting, via the wireless device, the response to an administrator using a GUI on the wireless device, wherein the wireless server operates as a transparent interface between the wireless client and a network management application of the management server by communicating with the wireless client via the HTTP and with the network management application via Java data objects, and the wireless server further operates as a transparent interface between the network management application and the packet-switched network via the HTTP and the Java data objects; the method further comprising: performing, via the wireless server, transformation and interface functions to generate the Java data objects; and after receiving a HTTP network management request posted by the wireless client, the wireless server initiates a session via the wireless server, parses the HTTP network management request to extract appropriate request parameters, and forwards the request parameters to the transformation engine; wherein the network management information includes commands of set preferences and/or monitor performance, the commands configured to enable remote management functions of the distributed computer network system; and wherein the request data object comprises a control request that changes, reconfigures and controls devices, engines and objects in the system.

14. The computer program product of claim 13 wherein the wireless server application communicates with the management server over a SSL and wherein the network management information is generated from input to the GUI on the wireless device by the administrator.

15. The computer program product of claim 14 wherein the wireless device is unable to communicate with the management server.

16. The computer program product of claim 15 wherein the management server is able to construct, remove, and modify logical and virtual entities including virtual private networks, file systems, and logical storage volumes in response to network management information.

17. The method of claim 16 wherein the distributed computer network system includes storage devices, server computers, switches, and routers.

18. The method of claim 17 wherein the stateless protocol includes HTTP and the transformation engine creates responses in XML, that conform to HTTP and wherein the wireless server determines whether the network management information corresponds to a report request or the control request.

19. The method of claim 1 wherein the request data object comprises a query for network information.

20. The system of claim 7 wherein the request data object comprises a query for network information.

21. The method of claim 1, wherein the commands configured to enable remote management functions of the distributed computer network system include a command instructing the management server to perform a poll of devices in the distributed computer network system, the command configured to enable a filter that limits the polled devices to a selected device type.

22. The method of claim 1, further comprising:
performing, by the wireless device via the management server, remote network management tasks, the network management tasks comprising:
construction, removal, or modification of logical or virtual entities, the logical or virtual entities including virtual private networks, file systems, logical storage volumes, computing clusters, and communication paths;
modification of attributes or parameters including names, addresses, priorities, permitted modes of operation, access controls, capacities, and levels of service; and
assignment of resources to, and removal of resources from, applications, including assignment of storage resources to a database application, and the assignment of network load balancing resources to an application such as a web server.

23. The method of claim 1, wherein performing a search, by the system interface engine to complete a call to the management server includes utilizing the type of request and type of data object to locate a service object corresponding to the requested service.

24. The method of claim 1, further comprising loading the wireless client onto a cellular telephone.

25. The method of claim 1, wherein the network management application is executable by the management server, the management server residing between the wireless server and the distributed computer network system.

* * * * *